United States Patent Office 3,708,483
Patented Jan. 2, 1973

3,708,483
SYNTHESIS OF POLYMERS FROM S-TRIAZINES
AND PERFLUORO-VINYL ETHERS
Richard W. Anderson, Midland, and Hughie R. Frick,
Williams Township, Bay County, Mich., assignors to
The Dow Chemical Company, Midland, Mich.
No Drawing. Filed Oct. 31, 1968, Ser. No. 772,426
Int. Cl. C07d 55/50
U.S. Cl. 260—248 CS                              5 Claims

ABSTRACT OF THE DISCLOSURE

Novel polymers of the following type are provided:

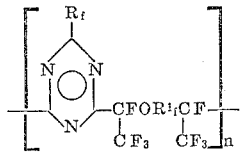

where $R_f$ is selected from the group consisting of normal and branched chain perhaloalkyl and perhaloalkyl ether groups; where $R^1_f$ is selected from the group consisting of perhalomethylene, perhalopolymethylene, perhalopolymethylene ethers, normal and branched chain perhaloalkyl substituted perhalomethylene, normal and branched chain perhaloalkyl substituted perhalopolymethylene, and normal and branched chain perhaloalkyl substituted perhalopolymethylene ethers, and where $n$ represents the degree of polymerization. Also provided is a process for the preparation of these polymers which comprises the reaction of (A)

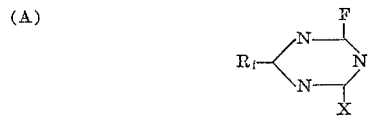

where $R_f$ is as defined above and X is independently selected from the group consisting of F or $R_f$, with (B) $CF_2=CFOR^1_fOCF=CF_2$, where $R^1_f$ is as defined above, in the presence of an alkali metal fluoride. When X is $R_f$, the diadduct will be formed.

The invention herein described was made in the course of, or under a contract or subcontract thereunder, with the Department of the Air Force.

This invention relates to copolymers of perhalogenated s-triazines and perhalogenated bis(perfluorovinyl) ethers and a method for the preparation of such polymers. These polymers are chemically and thermally stable.

It is a principal object of the present invention to provide novel copolymers of perhalogenated s-triazines and perhalogenated bis(perfluorovinyl) ethers.

It is a further object of the present invention to provide a novel copolymer of 2,4-difluoro-6-perfluoro-isopropyl-s-triazine and perfluoropentamethylene bis(perfluorovinyl) ether.

It is still another object of the present invention to provide a process for the production of said polymers.

These and other objects and advantages will become apparent from the detailed description presented hereinafter.

The present invention comprises novel polymers corresponding to the following general formula:

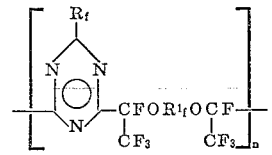

wherein $R_f$ is selected from the group consisting of normal and branched chain perhaloalkyl and perhaloalkyl ether groups; wherein $R^1_f$ is selected from the group consisting of perhalomethylene, perhalopolymethylene, perhalopolymethylene ethers, normal and branched chain perhaloalkyl substituted perhalomethylene, perhaloalkyl substituted perhalopolymethylene, and perhaloalkyl substituted perhalopolymethylene ether, and where $n$ represents the degree of polymerization. It is understood that the unsatisfied bonds in the above formula are satisfied by monovalent unreacted residue of the starting materials.

Also provided is a process for the preparation of these polymers which comprises the reaction of (A)

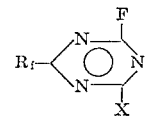

where $R_f$ is as defined above and where X is independently selected from the group consisting of F or $R_f$, with (B) $CF_2=CFOR^1_fOCF=CF_2$, where $R^1_f$ is as defined above, in the presence of an alkali metal fluoride. When X is independently selected from the group defined by $R_f$, the diadduct will be formed.

The polymers of the present invention may be used as chemically and thermally stable fluids and polymers; for example, as brake fluids and other hydraulic fluids, as well as electrical insulators particularly adapted for use at moderately elevated temperatures. Polymers of the present invention which contain only carbon, nitrogen, oxygen and fluorine as the elements comprising the molecule are of particular interest in that the absence of chlorine and hydrogen imparts excellent thermal stability and oxidation resistance to these materials.

Preferred embodiments of the compounds of the present invention are compounds having the following formula:

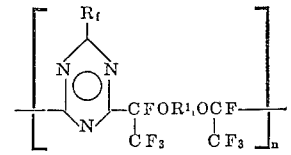

where $R_f$ is selected from the group consisting of normal and branched chain perhaloalkyl groups containing from about 1 to about 10 carbon atoms and normal and branched chain perhaloalkyl ether groups containing from about 3 to about 12 skeletal atoms, i.e., C and O; and where $R^1_f$ is selected from the group consisting of perhalomethylene, perhalopolymethylene containing from about 1 to about 20 carbon atoms, normal and branched chain perhaloalkyl substituted perhalomethylene containing from about 2 to about 20 carbon atoms, normal and branched chain perhaloalkyl substituted perhalopolymethylene containing from about 3 to about 20 carbon atoms, perhalopolymethylene ethers containing from about 3 to about 20 skeletal atoms; and normal and branched chain perhaloalkyl substituted perhalopolymethylene ethers of from about 4 to about 20 skeletal atoms, and where $n$ represents the degree of polymerization and is an integer, preferably an integer from about 2 to about 10,000.

In accordance with the present invention, the novel polymers of the preferred embodiment are prepared by reacting (A) 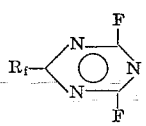

where $R_f$ is as defined above and where X is as hereinbefore defined, with (B) $CF_2=CFOR^1_fOCF=CF_2$ where $R^1_f$ is as defined above, in the presence of an alkali metal fluoride, preferably cesium fluoride, in a substantially anhydrous, inert, aprotic organic polar liquid.

The process of the present invention is usually carried out at a temperature of from about 0° C. to about 150° C., ordinarily at from about 50° C. to about 100 C., under the autogenous pressure generated by the reaction mass. The reaction is carried out until a significant amount of product is obtained, usually for at least about 24 hours. The reaction is ordinarily carried out for a period of from about 80 hours to about 160 hours, preferably from about 130 to about 150 hours.

Following the reaction period, the product usually is recovered by solvent extraction techniques and subsequent liquid-liquid separatory procedure, such as fractional distillation or vapor phase chromatography, in the case of liquid polymers and subsequent precipitation by acetonitrile in the case of solid polymers. The recovered product is subsequently heated under high vacuum to remove excess solvent.

Usually at a minimum, about stoichiometric quantities of the reactants are used to prepare the polymers of the present invention. The preferred molar ratio of reactants to alkali metal fluoride is 4:4:1, although the amount of alkali metal fluoride is not critical and a reaction generating amount will be sufficient.

Solvents suitable for use in this invention are those polar aprotic liquids which are inert to the reactants and products, and which will dissolve the reactants and remain liquid at the reaction temperatures, Suitable solvents are, for example, diethylene glycol dimethyl ether, N,N-dimethylformamide, tetramethylene sulfone, N,N-dimethylacetamide, and the like.

The following examples will serve to further illustrate the present invention but are not meant to limit it.

EXAMPLE 1

2,4-difluoro-6 - perfluoroisopropyl - s - triazine and perfluoropentamethylene bis(perfluorovinyl) ether were carefully purified by vapor phase chromatography. All materials were handled in a dry box to eliminate the possibility of hydrolysis. Exactly 1.32 g. (0.00464 mole) of the triazine compound, 2.05 g. (0.00464 mole) of the divinyl ether compound, 0.20 g. (0.0012 mole) of CsF, and 0.3 ml. of dry tetramethylene sulfone were placed into the reaction vessel. The reactor consisted of a 15 ml. polymer tube closed by a valve attached by a Swagelok fitting. This mixture was heated at 90° C. for 68 hours and then for 72 hours at 100° C. At the end of this period the amber, tacky polymer was extracted from the reaction mixture with trichlorotrifluoroethane. To this extract was added acetonitrile, which precipitated the polymer product. This precipitate was treated at 100° C. under high vacuum to remove any excess solvent. The product was characterized as having the following formula:

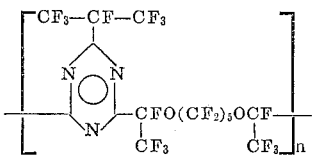

The infrared spectrum showed characteristic absorption at 6.5, 7.8, 8.0 to 9.0, and 10.2μ. The nuclear magnetic resonance spectrum was consistent with the proposed structure.

Elemental analysis gave C, 24.6%; F, 65.7%; N, 5.9%. Calculated weight percentages were: C, 24.7%; F, 65.2%; N, 5.8%.

Results, substantially the same as those obtained in Example 1, are achieved by reacting, in substantially the manner set forth in Example 1,

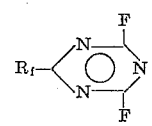

with $CF_2=CFOR^1_fOCF=CF_2$ wherein $R_f$ is, for example, perfluoromethyl, perfluoroethyl, perfluoropropyl, perfluorobutyl, perfluoroisobutyl, perfluoropentyl, perfluorohexyl, perfluoroheptyl, perfluorooctyl, perfluorononyl, perfluorodecyl, perfluoroundecyl, perfluorododecyl, perfluorotridecyl, perfluorotetradecyl, perfluoropentadecyl, perfluorohexadecyl, perfluoroheptadecyl, perfluorooctadecyl, perfluorononadecyl, or perfluoroeicosyl; also operable are s-triazine compounds, as described above, wherein $R_f$ includes, for example, other perhalo groups such as perchloromethyl, difluorochloromethyl, dichlorofluoromethyl, perchloropropyl, pentafluorodichloropropyl, perchlorodecyl, polychloropolyfluorodecyl, perchloropentadecyl, polychloropolyfluoropentadecyl, perchloro eicosyl, and polychloropolyfluoroeicosyl; and wherein $R^1_f$ is, for example, perfluoromethylene, perfluorodimethylene, perfluorotrimethylene, perfluorohexamethylene, perfluorodecamethylene, perfluoropentadecylmethylene, perfluoroeicosamethylene, perchloromethylene, fluorochloromethylene, perchlorotrimethylene, polychloropolyfluorotrimethylene, perchlorodecamethylene, polychloropolyfluorodecamethylene, perchloroeicosamethylene, polychloropolyfluoroeicosamethylene, perfluoromethylene oxy perfluoromethylene, perfluoromethylene oxy perfluorordimethylene, perfluorodimethylene oxy perfluorotetramethylene, perfluoroheptamethylene oxy perfluoroheptamethylene, perfluorononamethylene oxy perfluorononamethylene, perfluorotetramethylene oxy perfluorotridecamethylene, perchloromethylene oxy perchloromethylene, or perchlorotetramethylene oxy perfluorotridecamethylene.

When 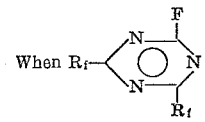

wherein the two $R_f$ substituents are as defined above and may be the same or different, is reacted with $CF_2=CFOR^1_fOCF=CF_2$, wherein $R^1_f$ is as defined above, in the presence of an alkali metal fluoride, in substantially the same manner illustrated above, a diadduct of the following formula is formed:

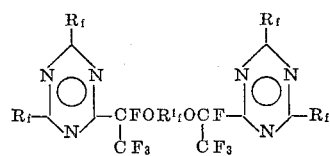

The formation of the diadduct is illustrated by the following example:

EXAMPLE 2

In a manner similar to that of Example 1, 2-fluoro-4,6-bis(perfluoro-1-butoxyethyl)-s-triazine and perfluoropentamethylene bis(perfluorovinyl) ether were carefully purified. With the reactants being handled in a dry box to prevent any hydrolysis, 1.7 g. (0.0038 mole) of the divinyl ether, 5.2 g. (0.0068 mole) of the triazine compound and 1 ml. of dry tetramethylene sulfone solvent were placed into a 3 oz. Fischer-Porter bottle. The reaction vessel was evacuated at −196° C. and then warmed to 100° C. and stirred for 20 hours. At the end of this period the product was extracted from the reaction mixture with trichlorotrifluoroethane and purified by vapor phase chromatography.

The product having a determined molecular weight of 2010 (theoretical 1978) was characterized as having the following formula:

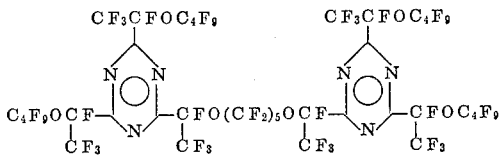

Mass spectral data were consistent with the above formula.

Various modifications can be made in the present invention without departing from the spirit or scope thereof for it is understood that we limit ourselves only as defined in the appended claims.

We claim:

1. A polymer having the formula:

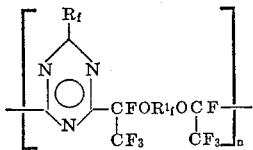

wherein $R_f$ is selected from the group consisting of normal and branched chain perhaloalkyl groups containing from 1 to 10 carbon atoms and perhaloalkyl ether groups containing from 3 to 12 carbon and oxygen atoms; wherein $R^1_f$ is selected from the group consisting of perhalomethylene, perhalopolymethylene containing from 1 to 20 carbon atoms, normal and branched chain perhalopolymethylene ethers containing from 3 to 20 carbon atoms, perhaloalkyl substituted perhalomethylene containing from 2 to 20 carbon atoms and perhaloalkyl substituted perhalopolymethylene ethers containing from 4 to 20 skeletal atoms, and where $n$ is an integer from 2 to 10,000.

2. The polymer of claim 1 wherein $R_f$ is selected from the group consisting of normal and branched chain perfluoroalkyl and perfluoroalkyl ether groups and wherein $R^1_f$ is selected from the group consisting of perfluoromethylene, perfluoropolymethylene, perfluoropolymethylene ethers, normal and branched chain perfluoro alkyl substituted perfluoropolymethylene, normal and branched chain perfluoroalkyl substituted perfluoropolymethylene, and normal and branched chain perfluoroalkyl substituted perfluoropolymethylene ethers.

3. A polymer having the formula

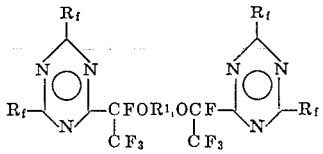

wherein $R_f$ is selected from the group consisting of normal and branched chain perhaloalkyl groups containing from 1 to 10 carbon atoms and perhaloalkyl ether groups containing from 3 to 12 carbon and oxygen atoms; wherein $R^1_f$ is selected from the group consisting of perhalomethylene, perhalopolymethylene containing from 2 to 20 carbon atoms, normal and branched chain perhalopolymethylene ethers containing from 3 to 20 skeletal atoms, perhaloalkyl substituted perhalopolymethylene containing from 2 to 20 carbon atoms, and perhaloalkyl substituted perhalopolymethylene ethers containing from 4 to 20 skeletal atoms.

4. The polymer of claim 1 wherein $R_f$ is $C_3F_7$— and $R^1_f$ is —$(CF_2)_5$—.

5. The polymer of claim 4 wherein $R_f$ is $CF_3CFOC_4F_9$ and $R^1_f$ is $(CF_2)_5$.

References Cited

UNITED STATES PATENTS 3,525,746   8/1970   Young et al. _____ 260—248 X

OTHER REFERENCES

Dressler et al., J. Org. Chem., vol. 32, pp. 2004–5 (June 1967).

Young, "Fluorine Chemistry Reviews," vol. 1, p. 382 (1967).

JOHN M. FORD, Primary Examiner

U.S. Cl. X.R.

260—88.3 R, 91.1 R; 252—403, 78 UA

PO-1050
(5/69)

UNITED STATES PATENT OFFICE
CERTIFICATE OF CORRECTION

Patent No. 3,708,483                    Dated January 2, 1973

Inventor(s) Richard W. Anderson and Hughie R. Frick

It is certified that error appears in the above-identified patent and that said Letters Patent are hereby corrected as shown below:

Column 1, line 15, in the formula insert an --O-- between the $R^1_f$ and CF, as follows:

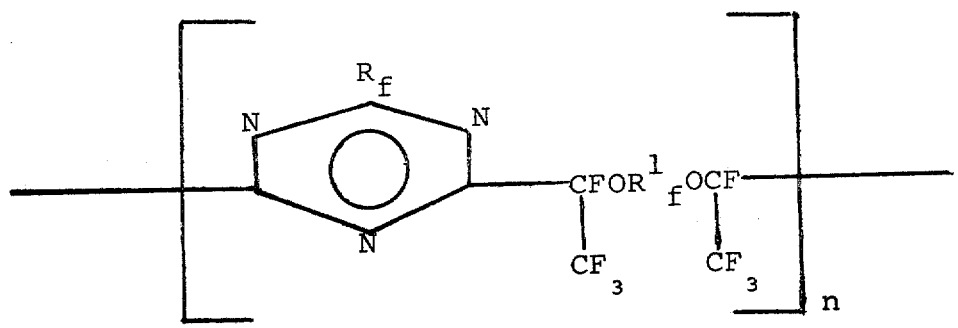

Column 1, line 35. Please issue a Certificate of Correction indicating that a circle should be placed inside the ring at line 35 to show that the ring is benzenoid in nature.

Column 3, line 15 - The substituent in one of the positions meta to substituent $R_f$ should be X rather than F.

Signed and sealed this 29th day of May 1973.

(SEAL)
Attest:

EDWARD M. FLETCHER, JR.
Attesting Officer

ROBERT GOTTSCHALK
Commissioner of Patents